W. Bray.
Refrigerator Car.
No. 82,076.      Patented Sep. 15, 1868.
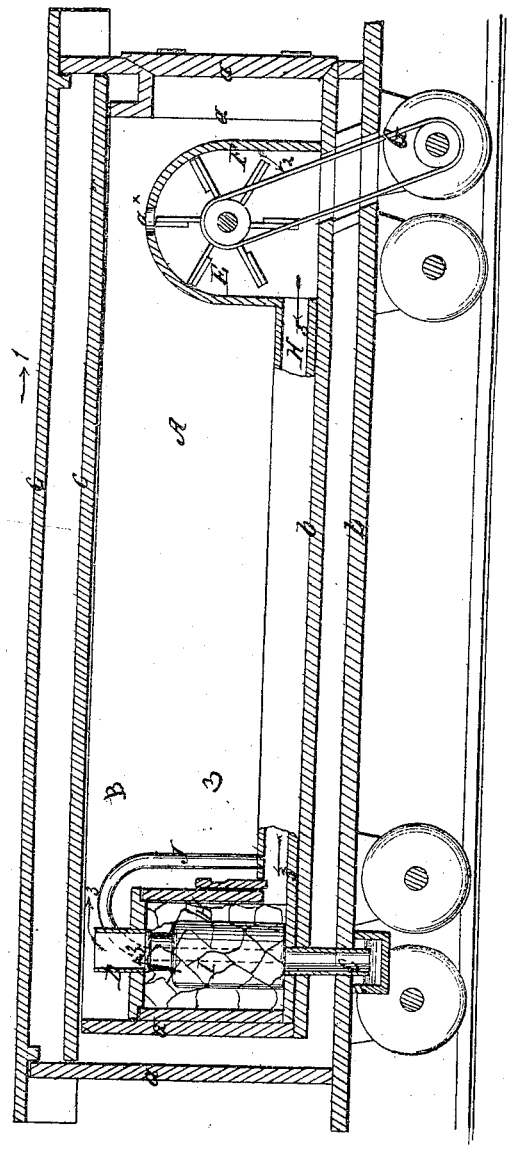
Witnesses.
Wm. A. Morgan
G. Cotton
Inventor.
W. Bray
per Munn & Co
Attorneys

UNITED STATES PATENT OFFICE.

WILSON BRAY, OF STOCKTON, NEW JERSEY.

IMPROVED REFRIGERATOR.

Specification forming part of Letters Patent No. 82,076, dated September 15, 1868.

*To all whom it may concern:*

Be it known that I, WILSON BRAY, of Stockton, in the county of Hunterdon and State of New Jersey, have invented a new and useful Improvement in Refrigerators; and I do hereby declare that the following is a full, clear, and exact description thereof, which will enable others skilled in the art to make and use the same, reference being had to the accompanying drawing, forming part of this specification, in which the drawing represents a side sectional view of a railway provision-car provided with my improvement.

This invention relates to a new and useful improvement in refrigerators, and the improvement is applicable to railway provision-cars as well as to refrigerators, both on large and small cars.

The invention consists in isolating or cutting off the provision-chamber from the external air, and forming a current of air within said chamber by means of a rotary fan or other suitable means, so that the air may be made to pass through an ice-chamber, and also through a vessel containing an absorbent of moisture and noxious vapors, and the air within the provision-chamber kept at a low temperature, pure and dry—conditions which are essentially requisite in keeping animal and vegetable substances in a perfect state of preservation.

The body of the car is constructed with double sides $a\ a$, a double bottom, $b\ b$, and a double top, $c\ c$, a space, say, of four inches, being allowed between the double sides, bottom, and top, which space is filled with charcoal or other suitable non-conducting material, in order to keep the interior of the car— the provision-chamber A—as free from external atmospheric influences as possible. Within the chamber A, at one end thereof, there is placed an ice-box, B, which has a siphon, C, at its lower end, to admit of the discharge of waste-water from B, and still exclude the air therefrom. On the top of the ice-box B there is placed a box, D, in which pulverized charcoal or other absorbent of moisture and noxious vapors is placed. E is a fan, which is placed within a suitable box, F, and driven by a belt, G, or gearing from one of the axles of the car.

It is not designed that the fan-box F shall have any communication with the external air; but it communicates with the chamber A by an opening, $a^x$, in its top, or at any other suitable part. The lower parts of the fan-box F and ice-box B are made to communicate with each other by means of a trunk or pipe, H.

By this arrangement, as the car is drawn along in the direction indicated by the arrow 1, the fan E will be rotated in the direction indicated by arrow 2, and a current of air will be forced through the pipe H, ice-box B, and box D, as indicated by the arrows 3. By this means the air within A will be kept at a low temperature, and the charcoal or other substance in D will absorb the moisture in the air, and also the noxious vapors contained therein.

I design, in practice, to have the inner surface of the provision-chamber lined with sheet metal, in order that the moist vapor coming in contact with it may condense thereon, and roll or pass down the sides thereof without being absorbed, as would be the case if the sides of A had an exposed wooden surface.

In localities where ice is scarce and very expensive, as, for instance, in southern climates, a water-receptacle, I, may be placed in box B, and surrounded by a freezing-mixture, composed of muriatic acid, five parts, and sulphate of soda, eight parts; and a pipe, J, may extend from pipe H and pass down into the water in I. (These parts are shown in red in the drawing.)

The chief difficulty in keeping animal and vegetable substances in a good state of preservation any material length of time is due to the moisture and noxious vapors which emanate from said substances.

A provision-chamber, even if kept at a low temperature, will not, if damp, keep animal and vegetable substances in good condition.

By my improvement I am enabled to maintain a low, pure, and dry air within the provision-chamber.

Stationary refrigerators must have their fan or other device used for fanning the current operated by hand or other power.

Having thus described my invention, I claim as new and desire to secure by Letters Patent—

The forming or producing of a current of air within the provision-chamber of a refrigerator by means of a rotary fan or other mechanical device, so arranged as to impel or force the air through an ice-box or water-vessel surrounded by a freezing-mixture, and also through a vessel containing charcoal or other absorbent of moisture and noxious gases, substantially as shown and described.

WILSON BRAY.

Witnesses:
 JOS. L. HOPPOCK,
 THOS. DYER.